United States Patent Office 2,854,659
Patented Sept. 30, 1958

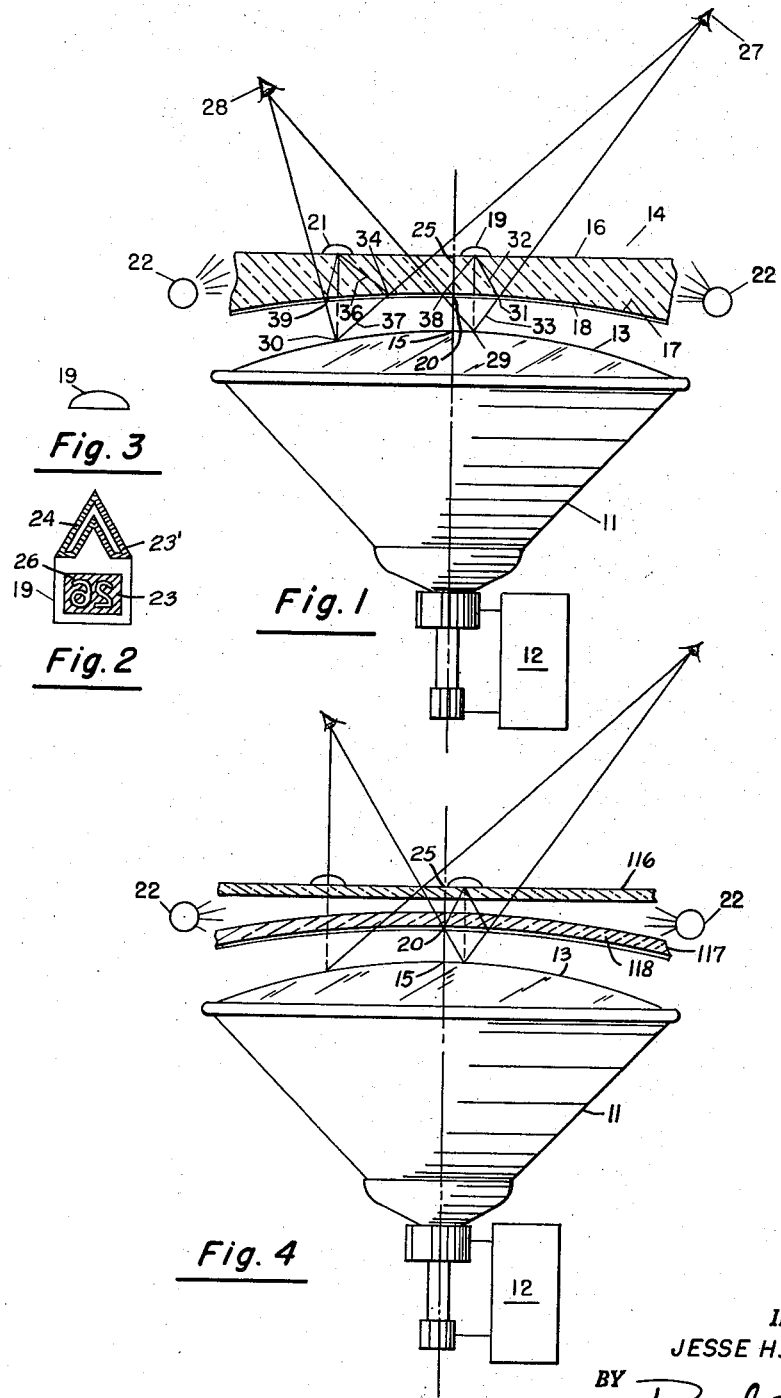

2,854,659

PLOTTING DEVICE

Jesse H. Haines, Philadelphia, Pa., assignor to Allen B. Du Mont Laboratories, Inc., Clifton, N. J., a corporation of Delaware Application December 13, 1952, Serial No. 325,860

11 Claims. (Cl. 340—369)

This invention relates to radar plotting devices and to means for reducing parallax and identification errors therein.

Radar plotting devices incorporate a plan position indicator, commonly known as P. P. I., which displays on a cathode ray tube screen an electronically drawn map of a given area, usually centered about the communication center in which the device is located and on which appear bright spots or "pips" indicating objects, such as aircraft or ships. In many cases it is desired, by means of "markers," to identify certain of the pips as belonging to particular aircraft or particular ships, and to keep track of their movements relative to the other targets in the area. For this purpose, some radar plotting devices have been constructed in which the cathode ray tube is mounted with its axis vertical and with a sheet of flat transparent material, such as glass or Lucite, placed over the tube face to enable the operator of the device to identify certain targets by positioning the aforementioned markers on the flat surface. However, it has been found that the parallax involved is considerable since the cathode ray tube face is normally spherical and the transparent surface is generally flat so that, at least at the edges of the device, there is a considerable distance between the markers and the pips which they are to identify. As a result, it is necessary to view such plotting boards directly from above.

In order to overcome this necessity, half-silvered, or semi-transparent, mirrors have heretofore been provided between the cathode ray tube screen and the transparent flat surface. The effect of the half-silvered mirror is to reflect the marker elements in such a way as to cause them to appear to be in the surface of the cathode ray tube screen, but since the cathode ray tube screen is spherical and not flat a plane mirror does not represent the ideal solution.

It is one object of the invention to provide an improved radar plotting device.

Other objects are to provide parallax-reducing apparatus for use in connection with radar plotting devices, and to provide more positive identification of target indicating markers.

Further objects will be apparent from the following specification together with the drawing in which:

Figure 1 is a side elevational view of a radar plotting device constructed according to the invention;

Figures 2 and 3 are top and side views respectively of an indicating marker as used in the device in Figure 1, and Figure 4 is a modification of the radar plotting device shown in Figure 1.

It is proposed in the present invention to provide a spherical half mirror in which the radius of the spherical surface thereof is approximately twice the radius of the spherical surface of the cathode ray tube screen, the mirror being positioned substantially half way between the latter surface and the plane surface on which the markers are located.

It is further proposed that the markers themselves be constructed of transparent material such as Lucite, at least part of the base of each marker being coated with an opaque paint and that fluorescent paint be applied to the opaque paint so that the fluorescent paint faces the cathode ray tube and is not visible from above. By the addition of illuminating devices, such as ultra-violet lights applied as edge lighting to the transparent plotting surface on which the markers rest, the fluorescent paint of each of the markers may be made to glow, thereby producing a bright reflecting image on the spherical half-silvered mirror. This image of the marker is then in proper position with regard to the pip on the cathode ray tube faceplate to avoid substantially all parallax errors. Providing the fluorescent paint on the markers increases the brightness thereof and improves the identification of each of the targets represented thereby.

In the device shown in Figure 1, a cathode ray tube indicator 11 for P. P. I. radar apparatus is energized by a source 12 to provide on the faceplate 13 thereof a typical map-like pattern. This tube may be supported in any position and by any means, but preferably is placed with the axis thereof in a vertical position as shown and with a transparent plotting element 14 placed thereover.

The plotting element 14 has a substantially planar top surface 16 and a substantially spherical bottom surface 17 having a semi-transparent reflecting coating 18 thereon. The spherical generating radius of surface 17 is approximately twice the spherical generating radius of surface 13. The perpendicular distance between the centers 15 and 20 of the two surfaces 13 and 17, respectively, is approximately equal to the perpendicular distance between the center 20 of surface 17 and the corresponding point 25 on surface 16. The edge of the plotting element 14 is illuminated by a plurality of light sources 22.

Markers 19 and 21 rest on the surface 16. The markers, one of which is shown more clearly in Figure 2, are small bits of transparent material with an opaque, usually black, paint applied to the under surface thereof as indicated by the dark areas 23 and 23'. Fluorescent material may be used to apply identification markers and numerals 24 and 26 respectively for instance, to desired portions of the opaque areas 23 and 23'. The fluorescent markers are hidden from the opposite surface of the marker 19 by the opacity of the paint on area 23. The fluorescent numerals and marks are positioned so as to be readable when reflected from the coating 18.

In operation, the device of Figure 1 may be viewed from a number of angles as indicated by observers at points 27 and 28. The pips 29 and 30 may be seen on the cathode ray tube face 13 through the plotting surface 14. The semi-reflecting layer 18 on surface 17 is sufficiently thin to allow the surface 13 to be seen easily.

As the observer at 27 sees the pip 29, he also sees an image of the marker 19 reflected from the point 31 on the layer 18. Point 31 is directly in the line of sight between observer at 27 and the pip 29, and, due to the fact that at all points layer 18 is substantially halfway between surface 16 and the screen 13, lines 32 and 33 are equal so that the marker 19 appears to be in the screen 13. Correspondingly, the observer at 27 sees an image of the marker 21 reflected from the point 34 which is directly in line with the bright pip 30 on the surface 13, and because of the equal lengths of lines 36 and 37, the image of marker 21 also appears to be in the plane of surface 13.

On the other hand, the observer at 28 sees the images of markers 19 and 21 reflected from the points 38 and 39, respectively, in such a way as to appear coincident with the pips 29 and 30.

It may therefore be seen that no matter where the observer is located with respect to the plotting device, the reflected image of the marker will appear to be at substantially the same spot in the surface of screen 13 as the pip which the marker is to indicate. The markers may be moved about on the surface 16 to follow the movement of a particular pip on the surface 13. It is advantageous to have only the smallest necessary area of surface 13 obscured by markers, while retaining accurate identification of each marker. By providing fluorescent paint on the markers and exciting the paint with lighting, particularly ultraviolet rim lighting from the sources 22 in Figure 1, much smaller markers may be seen than if only the overall light from the P. P. I. presentation on screen 13 were utilized to illuminate them. Furthermore, by placing opaque paint, or material, between the fluorescent paint and the observer, only the reflected image will be seen, and that image, as described above, will appear to be located substantially in the fluorescent surface of screen 13.

The plotting element 14 has been shown as a solid piece of material in Figure 1. In order for such an arrangement to give the proper reflections, the index of refraction of element 14 should approach the value for air. However, slight corrections within the purview of those skilled in optical design may obviate the necessity for that particular value. An alternative construction is illustrated in Figure 4 in which the plotting element consists of separate pieces of transparent material for the top surface 116 and the semi-transparent mirror 117. The spacing between the fluorescent surface 13, the reflecting layer 118 and the top surface 116 remains substantially as in Figure 1, except for incremental adjustments to compensate for refraction at the several air-glass boundaries. The spherical surface 117 may be made in the same way that spherical faceplates, such as face 13 of tube 11, are produced, i. e. by sagging a single piece of heated plate glass as is well known in the tube-making art. Again, the index of refraction of elements 116 and 117 should approach unity (the value for air) or the thickness of elements 116 and 117 should be reduced as much as possible commensurate with their required strength.

Although this invention has been described in specific terms, it will be understood by those skilled in the art that modifications may be made therein within the scope of the following claims.

What is claimed is:

1. A plotting device comprising a cathode ray tube having a fluorescent screen curved with a spherical generating radius $r$, a substantially flat transparent plotting surface thereover, and a semi-transparent mirror, curved with a spherical generating radius of substantially $2r$, located between said screen and said surface.

2. A plotting device comprising a cathode ray tube having a fluorescent screen curved with a spherical generating radius $r$, a substantially flat transparent plotting surface covering said screen, and a semi-transparent mirror, curved with a spherical generating radius of substantially $2r$, positioned so that all points thereof lie substantially midway between said screen and said surface.

3. A plotting device comprising a cathode ray tube having a fluorescent screen curved with a particular spherical generating radius $r$, a transparent plotting element located in front of said screen, said plotting element having a substantially flat top surface and a substantially spherical bottom surface, said bottom surface comprising a semi-transparent mirror having a spherical generating radius $2r$, said bottom surface being located approximately midway between said top surface and said screen.

4. A plotting device comprising a cathode ray tube having a fluorescent screen curved with a spherical generating radius $r$, a substantially flat transparent sheet forming a plotting surface covering said screen and normal to the axis thereof, a second transparent sheet curved with a spherical generating radius of approximately $2r$, one surface of said second sheet having a semi-transparent reflective coating thereon, said second sheet being mounted with said coating approximately midway between said plotting surface and said screen.

5. An anti-parallax and pip-identification plotting device comprising: a fluorescent screen having a radius of curvature $r$; means for producing pips of light in said fluorescent screen; means for identifying selected pips of light, said means comprising a substantially flat transparent plotting surface positioned over said fluorescent screen; pip-identifying markers positionable on said plotting surface; means for causing the optical images of said markers to superpose on the optical images of said pips, said means comprising a semi-transparent mirror with a radius $2r$ positioned between said screen and said surface so that all points of said semi-transparent mirror lie substantially midway between said screen and said surface, whereby light from said fluorescent material is reflected from said semi-transparent mirror at the same point where light from said pip passes through said semi-transparent mirror.

6. The device of claim 5 wherein said markers comprise a body of transparent material; an opaque material located on a portion of the underside of said body; a fluorescent material positioned on said opaque material; a source of energy capable of exciting said fluorescent material; means for directing said energy to strike said fluorescent material.

7. The device of claim 1 wherein said plotting surface and said semi-transparent mirror are parts of a unitary structure.

8. The device of claim 2 wherein said plotting surface and said mirror consists of a single element.

9. The device of claim 5 wherein said plotting surface and said mirror form a single structure.

10. A positionable identifying device capable of being moved to different positions on a plotting surface, comprising a movable marker of transparent material having a substantially flat surface whereby said marker may be placed on said plotting surface; and a pattern of fluorescent material on said substantially flat surface whereby when said material is energized, the light therefrom indicates the position of said marker.

11. The device of claim 10 wherein said pattern of fluorescent material is positioned on an opaque coating, whereby direct light from said fluorescent material cannot be seen from above.

References Cited in the file of this patent

UNITED STATES PATENTS

| | | |
|---|---|---|
| 969,785 | Kellner | Sept. 13, 1910 |
| 1,398,823 | Wright | Nov. 29, 1921 |
| 1,420,184 | Day | June 20, 1922 |
| 1,534,937 | Foley | Apr. 21, 1925 |
| 1,596,328 | Wilt | Aug. 17, 1926 |
| 1,875,048 | Levene | Aug. 30, 1932 |
| 2,330,604 | Messner | Sept. 28, 1943 |
| 2,480,584 | Kohlhauer | Aug. 30, 1949 |
| 2,494,992 | Ferguson | Jan. 17, 1950 |
| 2,540,110 | Gall | Feb. 6, 1951 |
| 2,580,240 | Newman | Dec. 25, 1951 |
| 2,588,035 | O'Neil | Mar. 4, 1952 |
| 2,654,971 | Harrison | Oct. 13, 1953 |
| 2,655,836 | Sherwin | Oct. 20, 1953 |
| 2,717,995 | Hall | Sept. 13, 1955 |

FOREIGN PATENTS

| | | |
|---|---|---|
| 281,030 | Great Britain | Dec. 1, 1927 |
| 228,010 | Switzerland | Oct. 1, 1943 |
| 706,530 | Great Britain | Mar. 31, 1954 |